United States Patent [19]
Michels

[11] 4,228,884
[45] Oct. 21, 1980

[54] WRAPPING APPARATUS

[75] Inventor: Charles E. Michels, Racine, Wis.

[73] Assignee: Reliance Electric Company, Cleveland, Ohio

[21] Appl. No.: 931,645

[22] Filed: Aug. 7, 1978

Related U.S. Application Data

[62] Division of Ser. No. 785,137, Apr. 6, 1977, Pat. No. 4,134,246.

[51] Int. Cl.² .................................................. F16P 3/08
[52] U.S. Cl. .................................................. 192/135
[58] Field of Search ........... 192/133, 134, 135, 129 A, 192/129 B

[56] References Cited

U.S. PATENT DOCUMENTS

| | | | |
|---|---|---|---|
| 1,837,244 | 12/1931 | Watson | 192/135 |
| 2,813,569 | 11/1957 | Nelson | 192/135 X |
| 3,987,881 | 10/1976 | Perkins | 192/133 |
| 4,106,607 | 8/1978 | Badavas | 192/135 X |

*Primary Examiner*—Allan D. Herrmann
*Attorney, Agent, or Firm*—Ralph G. Hohenfeldt

[57] ABSTRACT

A machine for wrapping articles uses several guard covers to enclose its operating mechanism for safety purposes. A switch in the machine must be actuated to enable machine operation. At least one cover is provided with a switch actuator and one or more other covers have interlocks which must be properly set by having all covers in place to permit the actuator to actuate the switch.

4 Claims, 35 Drawing Figures

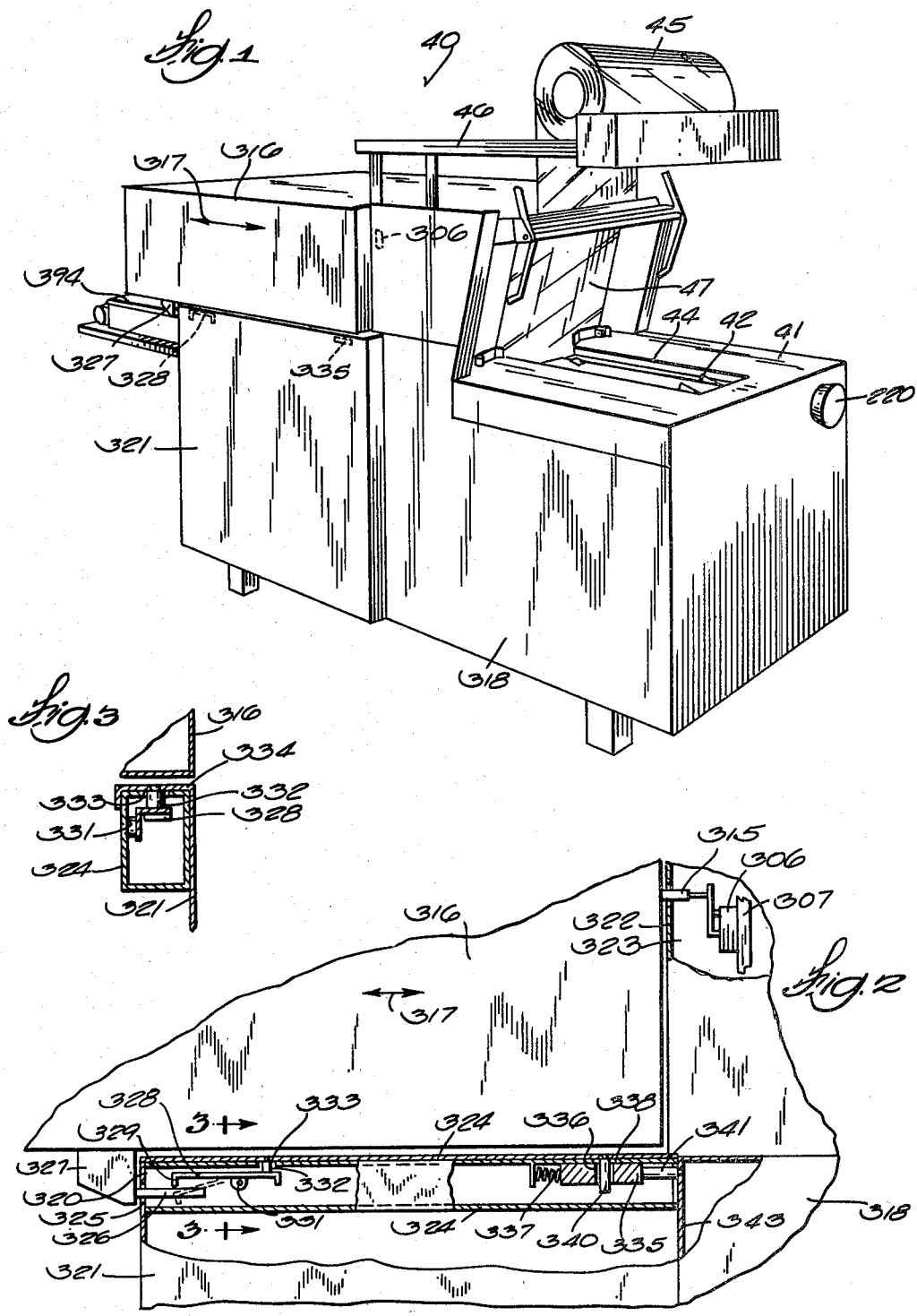

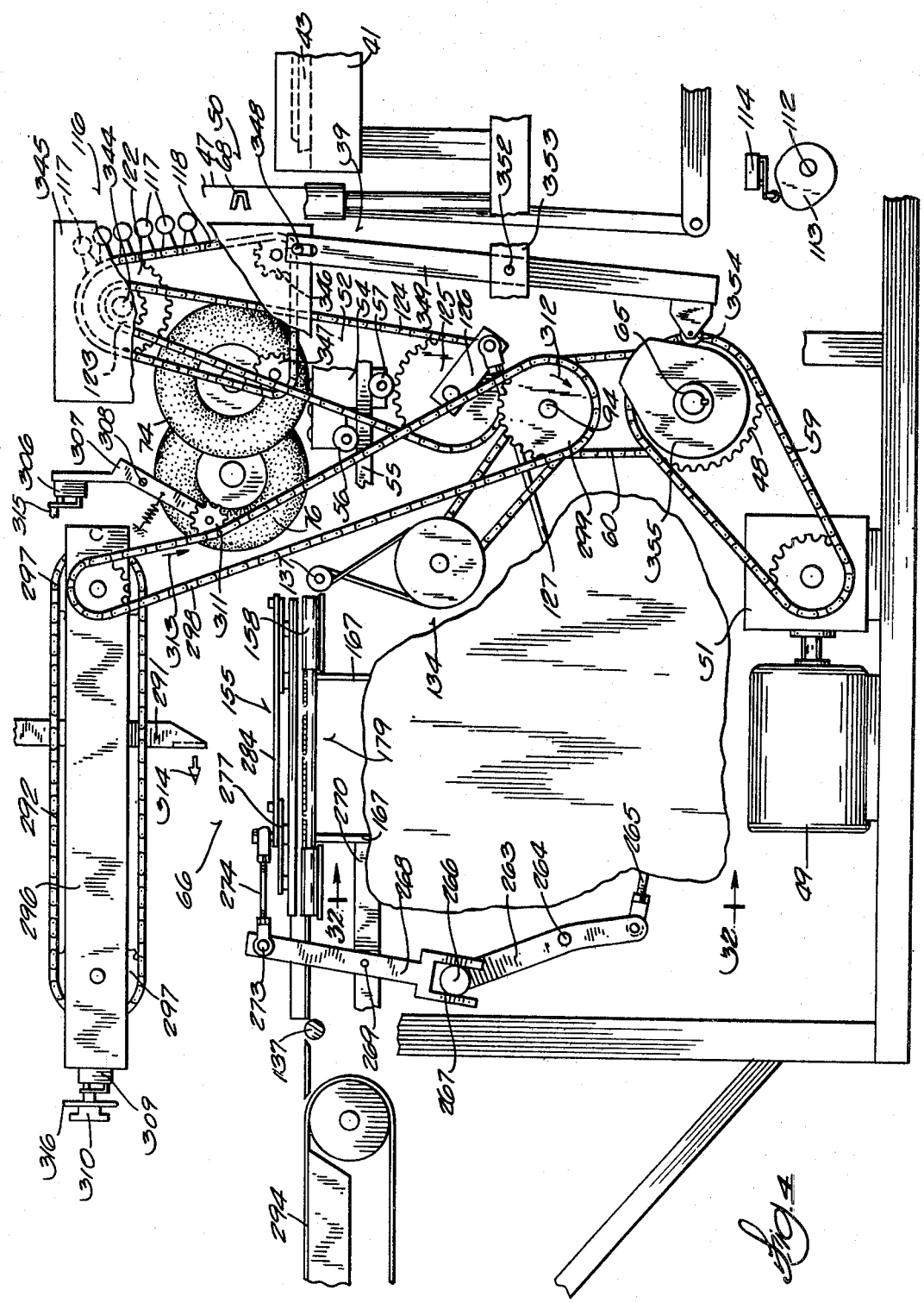

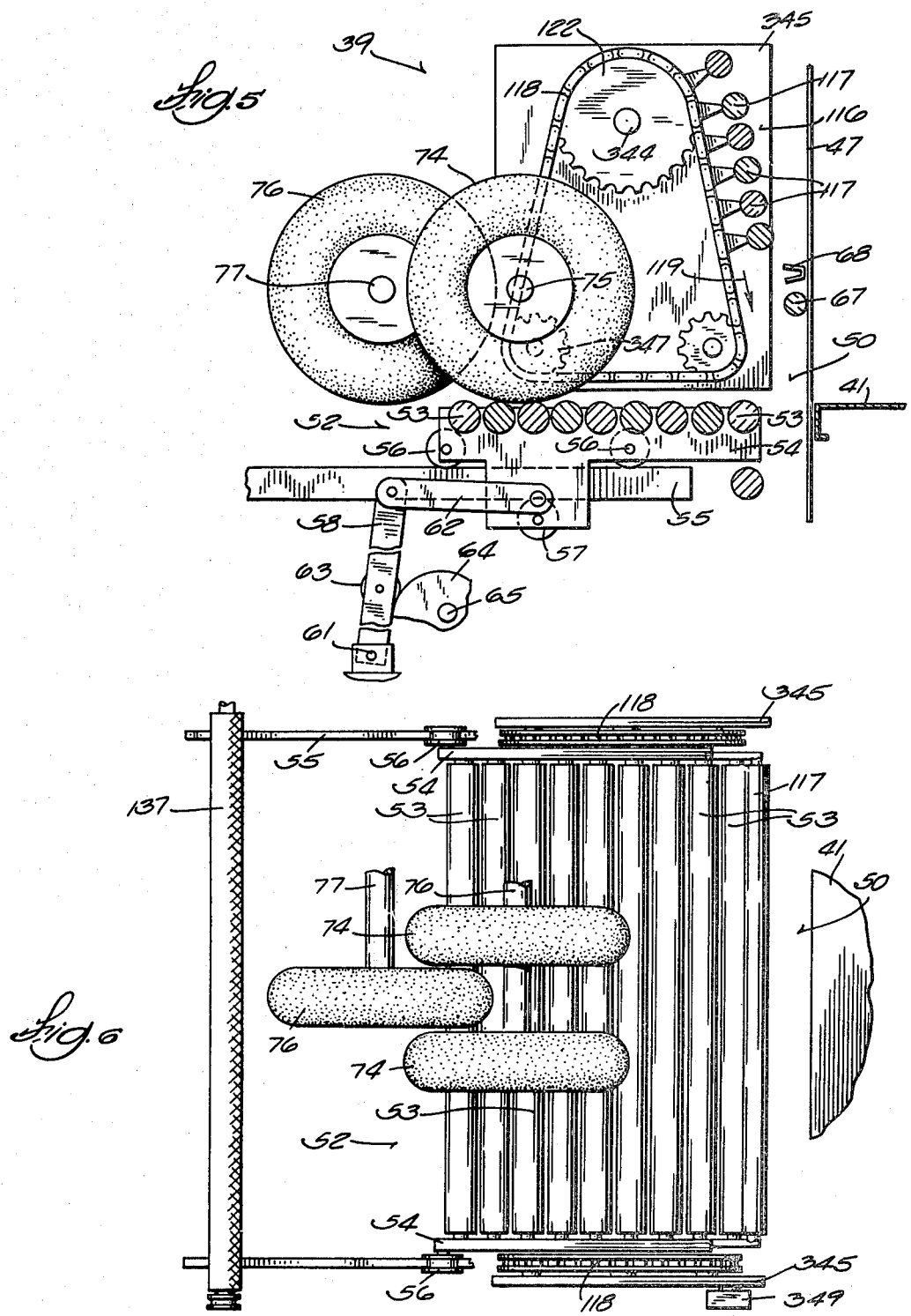

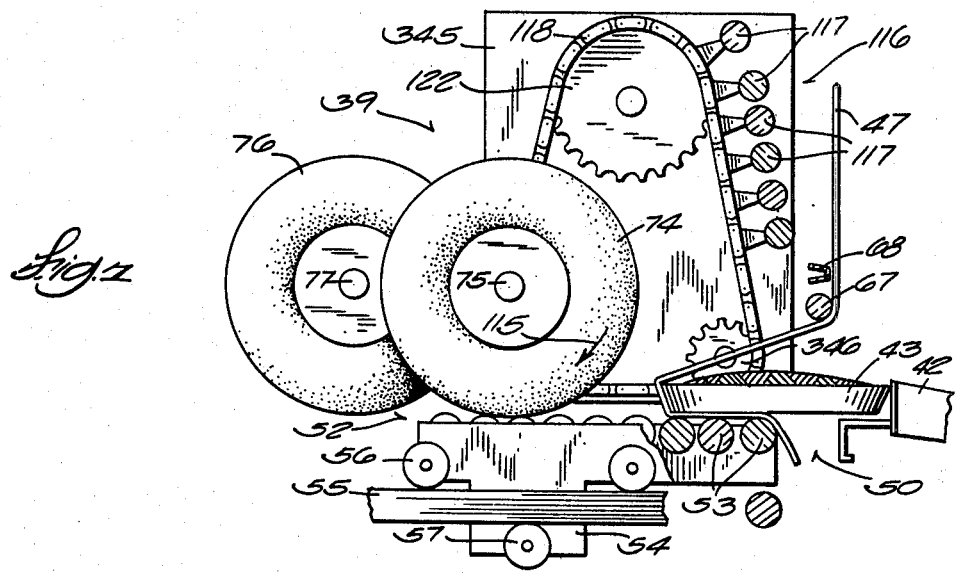
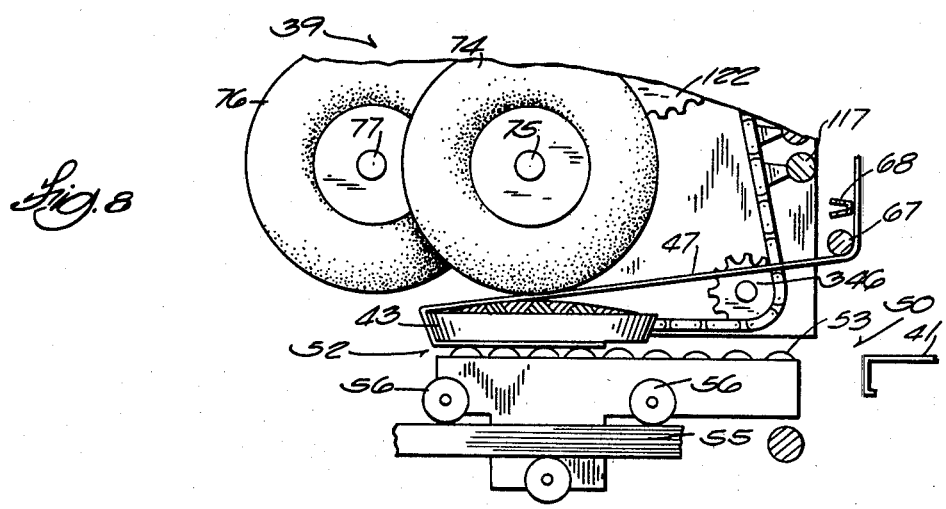
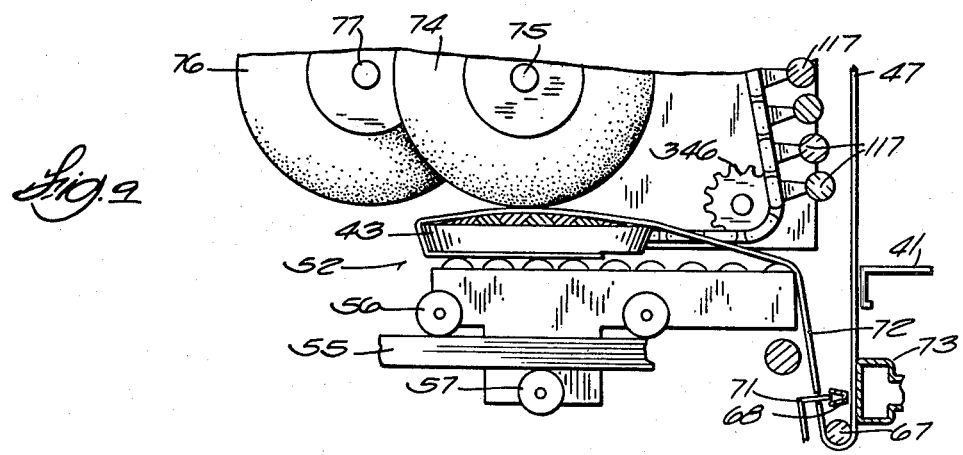

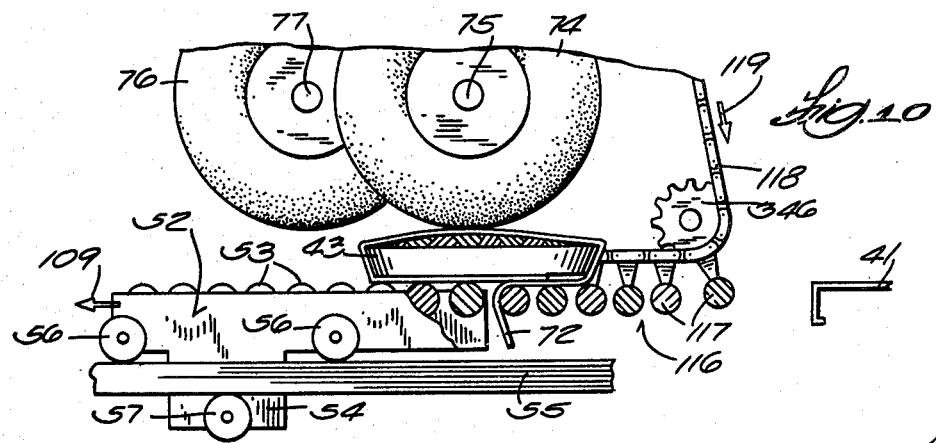
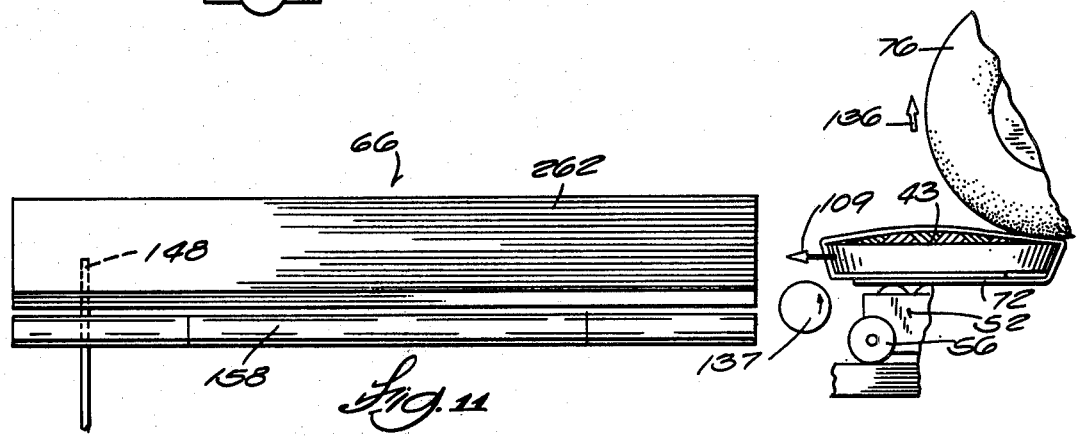
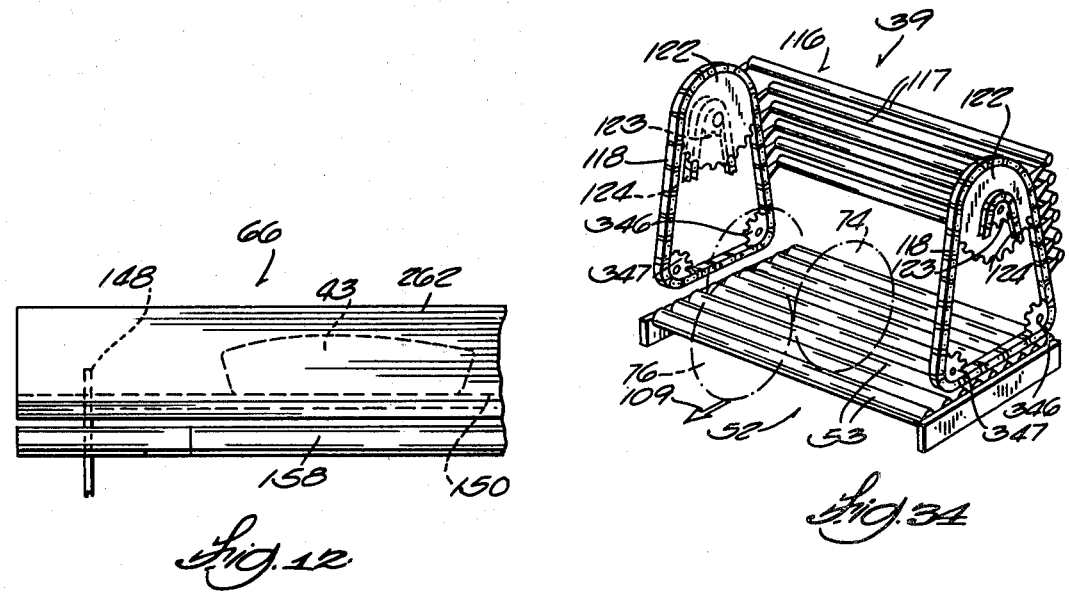

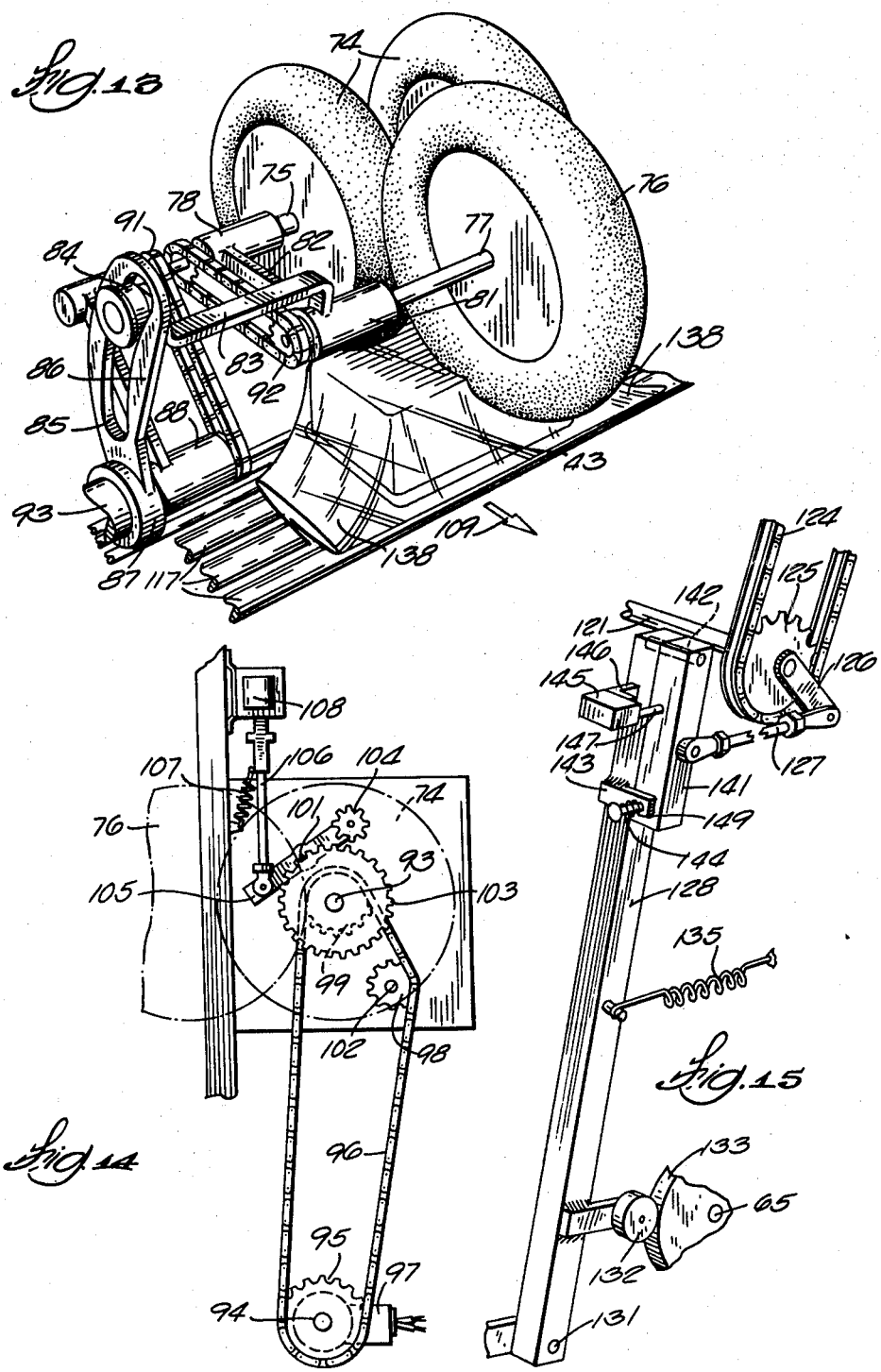

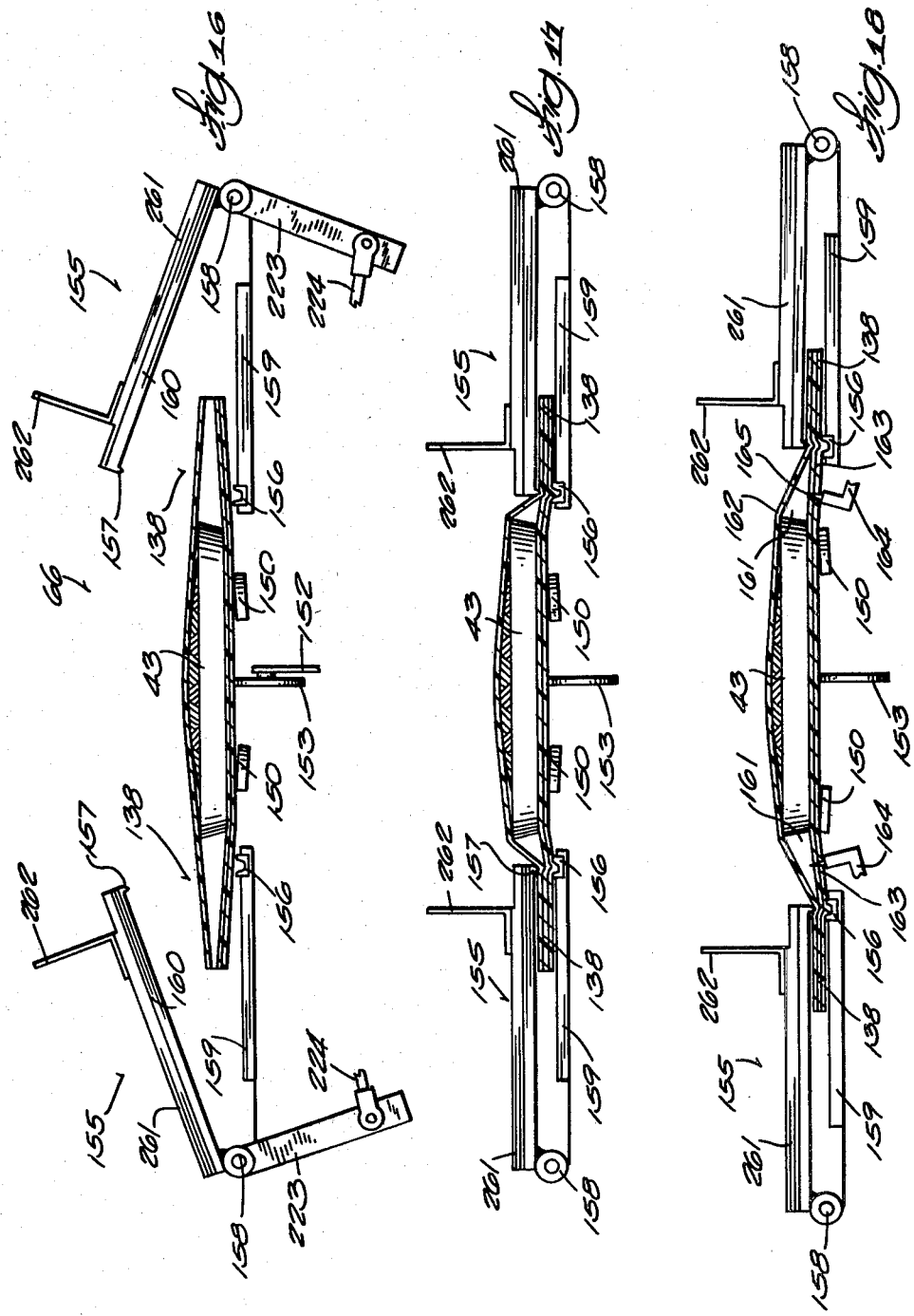

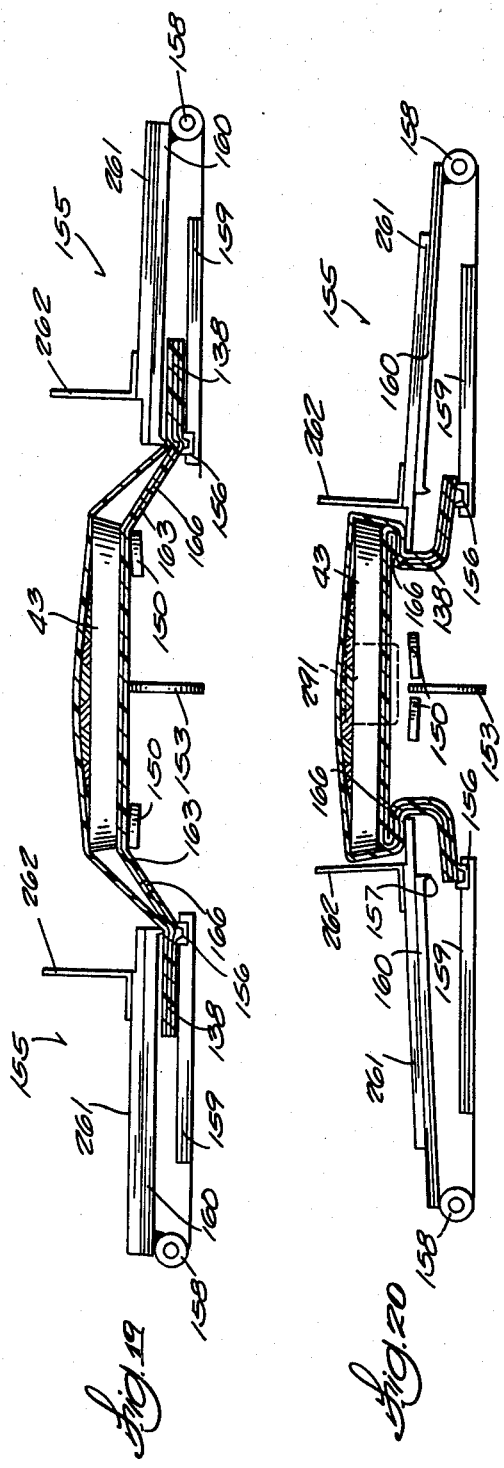
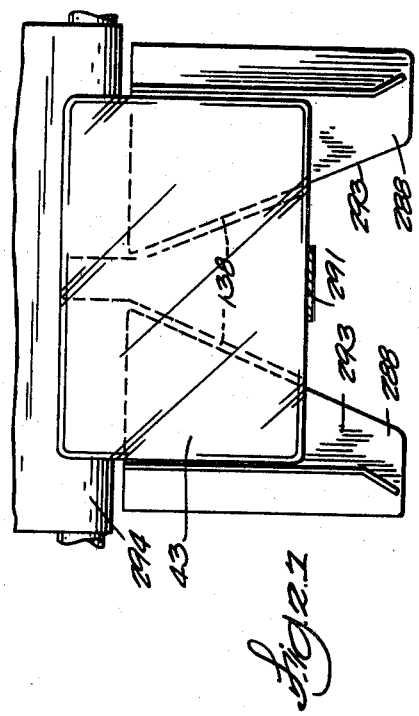
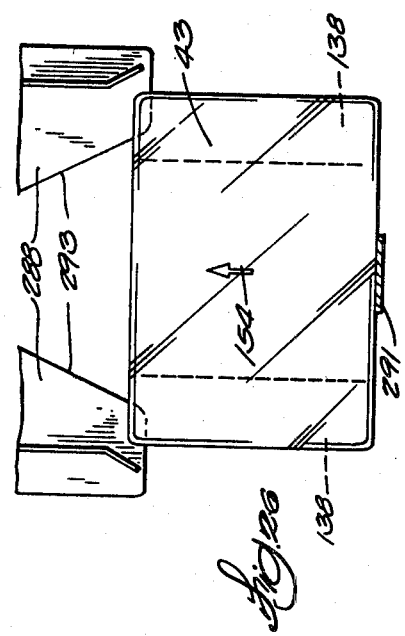

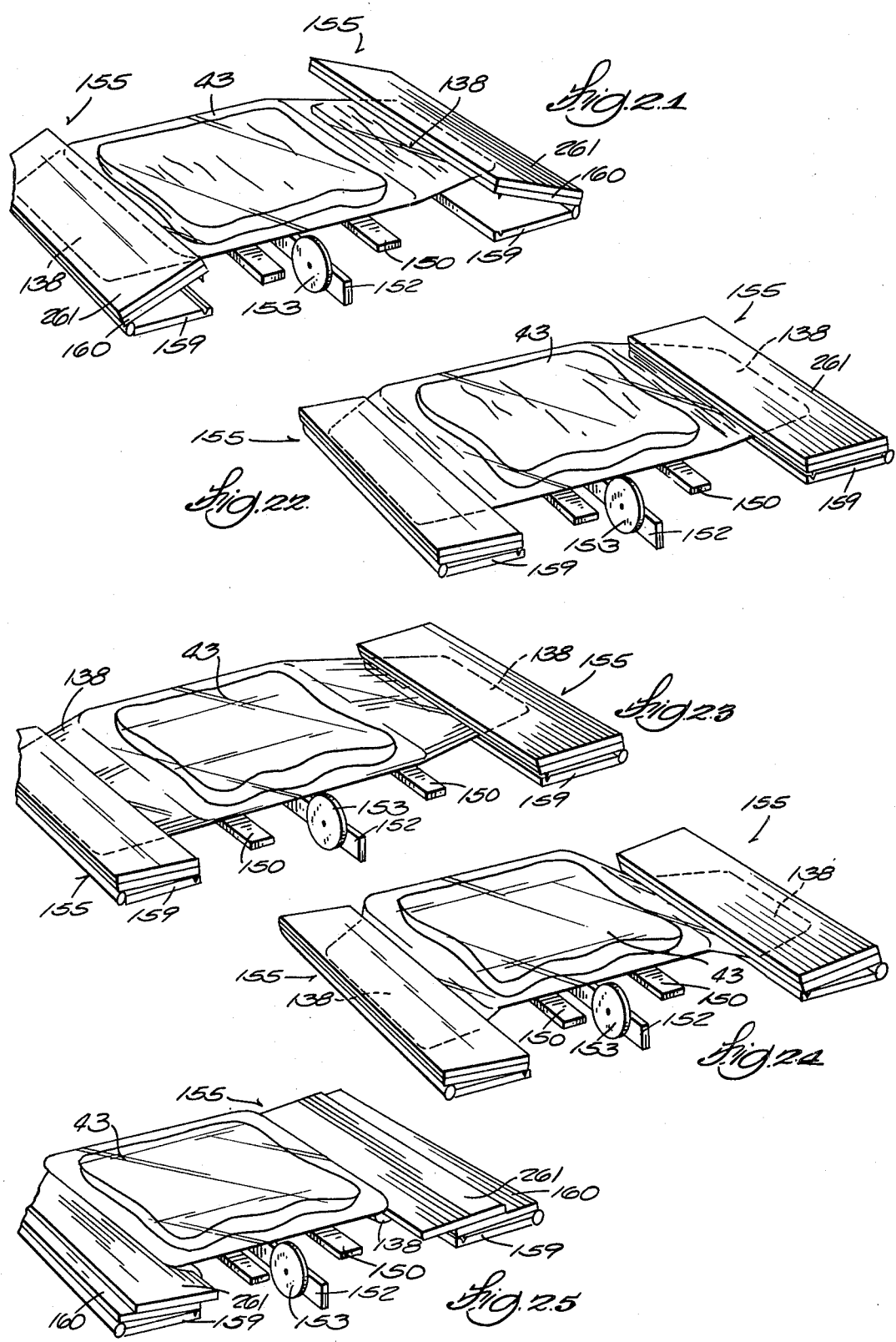

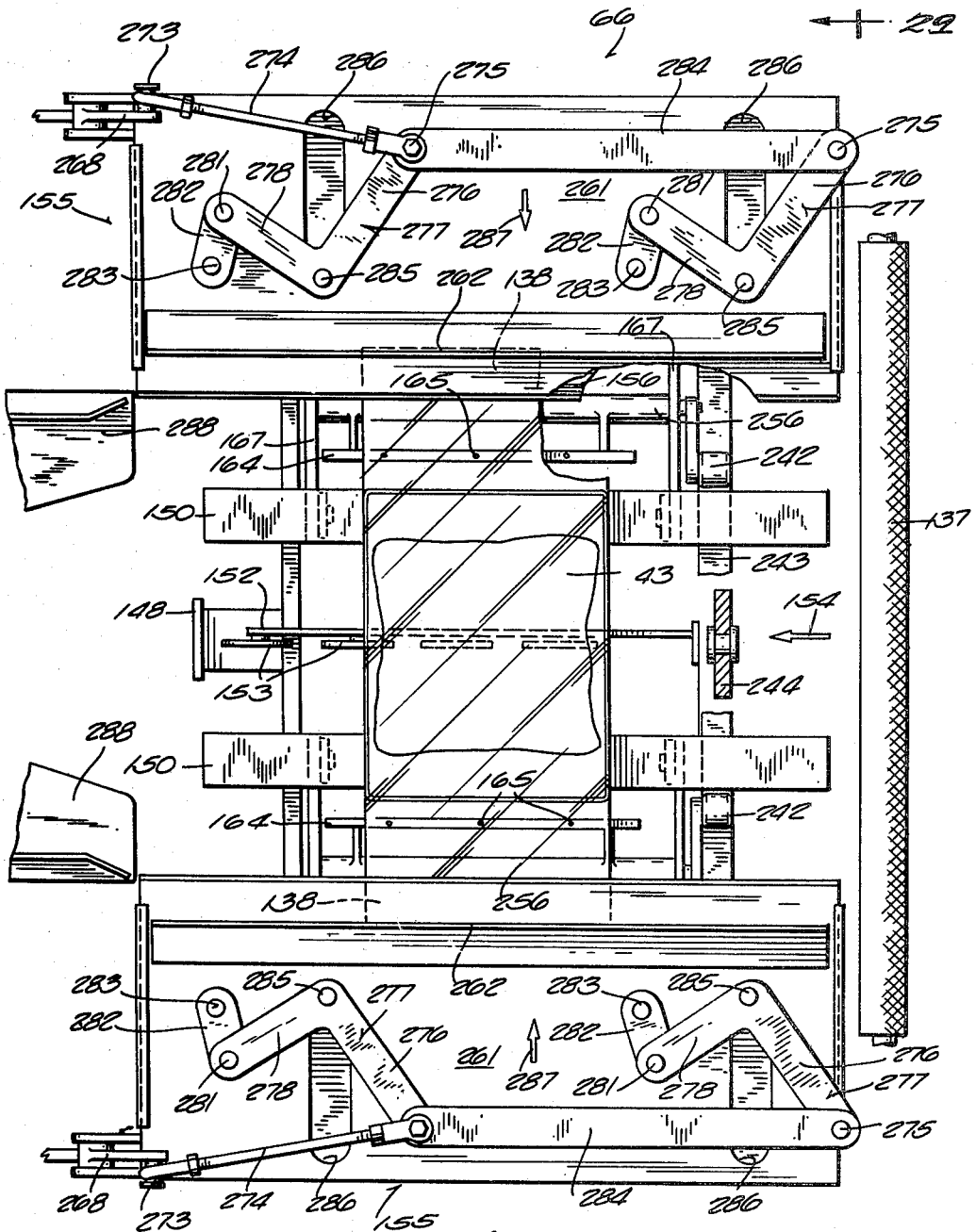
Fig. 2.8

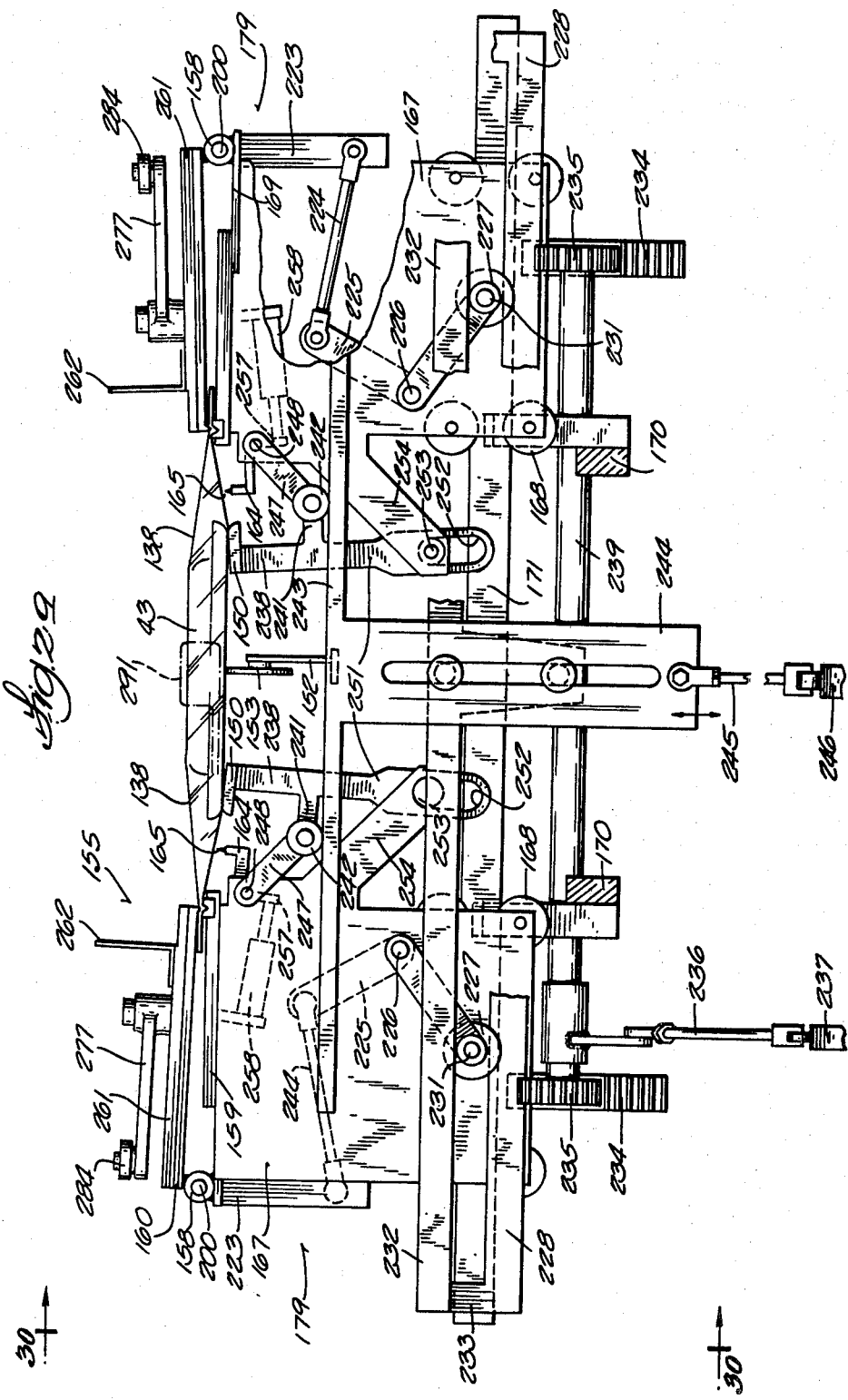

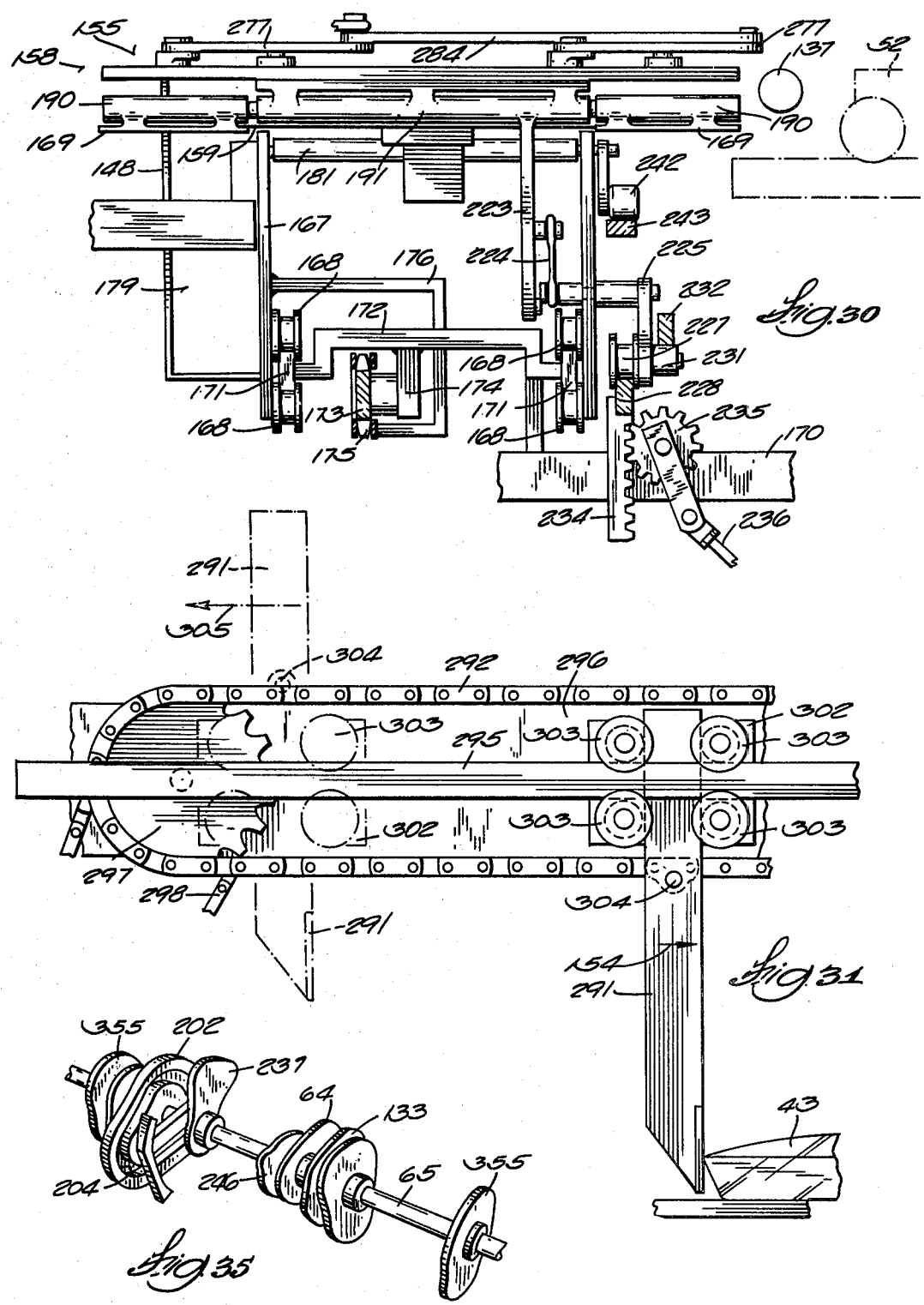

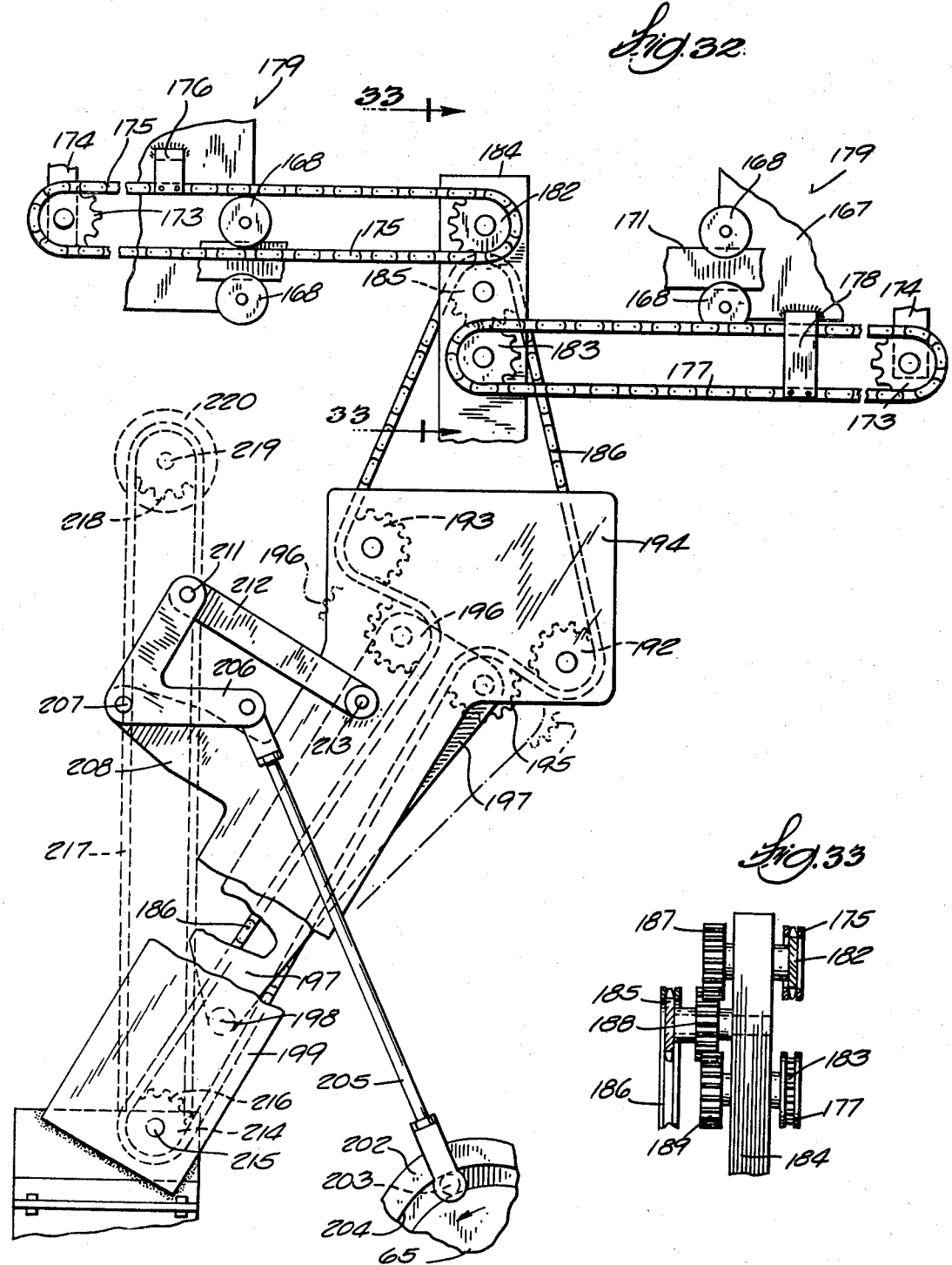
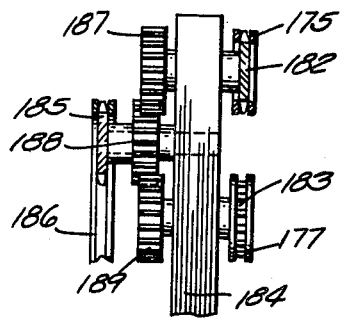

WRAPPING APPARATUS

CROSS REFERENCE TO RELATED APPLICATION

This application is a division of my copending U.S. patent application Ser. No. 785,137 filed Apr. 6, 1977, now U.S. Pat. No. 4,134,246.

BACKGROUND OF THE INVENTION

U.S. Pat. No. 3,816,969 discloses a fully automatic article wrapping machine designed to utilize shrink film. The apparatus of the present invention utilizes some of the features of the apparatus shown in said patent. However, in many other particulars, the apparatus is materially changed and new apparatus and relationships are utilized to stretch the film in the course of wrapping it about the article. The resultant packages have a neatly stretched attractive film wrapper with enhanced appearance, and it is not necessary to pass the package through a heated shrink tunnel.

SUMMARY OF THE INVENTION

As in the machine of U.S. Pat. No. 3,816,969, fully automatic wrapping is achieved and the machine will function automatically to make all folds and completely wrap the article. The first fold longitudinally about the article is made in substantially the same manner as in the apparatus shown in U.S. Pat. No. 3,816,969. However, additional longitudinal folding mechanism is provided to complete the folding of the film tail up against the bottom of the article before the article is delivered to the next station. While this folding action takes place, the article is held in position by overhead wheels which are selectively actuated to advance the article and selectively locked to hold the article in position while the underfold is being made. After the underfolding of the tail has been completed, the partially folded package with laterally extending film wings is advanced to a film stretching and wing folding station. Here, clamp jaws grasp the laterally extending wings and pull outwardly to stretch the film to a desired degree of tautness. The article is then lifted and the clamp jaws are concurrently advanced beneath the lifted article to fold the wings beneath the article without loss of film tension.

The apparatus is provided with various safety features including interlocks to prevent machine operation under certain circumstances. In accordance with one aspect of the invention, a switch utilized to shut off the machine in the event of a jam is also utilized to shut off the machine in the event one or another of several safety guards or covers are not closed.

Various other features are significant. These include:

1. The novel coaction between the film tail folding mechanism and a roller table which supports the article at the longitudinal folding station in which a roller assembly sweeps the film tail under the article and concurrently substitutes for the roller table as a support for the article.

2. Mechanism for altering the path of movement of the film tail folding roller assembly to avoid conflict with the path of movement of a film curtain sweep arm.

3. Apparatus for venting air from entrapment between the plies of the film wings, during the lateral stretch and underfold sequence.

4. Novel carriage apparatus which carry various actuating mechanisms for the lateral stretch and underfold sequence, said carriage apparatus being concurrently driven in and out in time with steps in said sequence.

5. Novel mechanism incorporating the same physical structure but operable in different modes for selectively performing the different but related functions of adjusting the stretch and fold mechanism carriages to match the width of articles processed on the machine and driving said carriages during the stretch and fold sequence.

6. Novel structure for the article discharge chain conveyor which cycles an article pusher in an article pushing step and an upwardly withdrawn retracting step.

Other objects, features, and advantages of the invention will appear from the disclosure hereof.

DESCRIPTION OF THE DRAWINGS

FIG. 1 is an over-all external perspective view of a machine embodying the invention, illustrating the safety covers in closed position.

FIG. 2 is a fragmentary enlarged side view of a portion of the machine shown in FIG. 1, partly broken away and shown in cross section to disclose details of several of the safety interlocks.

FIG. 3 is a cross section taken along the line 3—3 of FIG. 2.

FIG. 4 is a diagrammatic vertical cross section taken approximately through the longitudinal centerline of the machine.

FIG. 5 is a fragmentary view partly in elevation and partly in vertical cross section taken through the longitudinal fold section of the machine.

FIG. 6 is a fragmentary plan view of the machine parts shown in FIG. 5.

FIG. 7 is a fragmentary side elevation similar to FIG. 5, but showing an article in the course of being advanced from an input table against a vertical web or curtain of film, and into the longitudinal fold station.

FIG. 8 is a view similar to FIG. 7 showing the article in its fully advanced position in the longitudinal fold station.

FIG. 9 is a view similar to FIG. 7 and showing the sweep arm sweeping an additional length of film behind the advanced article.

FIG. 10 is a view similar to FIG. 7, but showing the film tail folding rollers advanced to fold the trailing tail of the film beneath the advanced article, and to support the rear end of the article.

FIG. 11 is a view showing the article with the longitudinal fold completed and in the course of being fed by the overhead wheels to the stretch and lateral fold station.

FIG. 12 is a fragmentary side view showing the article in the stretch station.

FIG. 13 is a fragmentary perspective view showing the floating mount for the overhead article control wheels and also showing the position of the package on the film tail folding rollers after they have swept beneath the article.

FIG. 14 is a fragmentary view illustrating drive and locking mechanism for the overhead article control wheels.

FIG. 15 is a fragmentary perspective view illustrating the drive mechanism to the chains on which the film tail folding rollers are mounted.

FIG. 16 is a fragmentary end elevation showing the article with laterally extending film wings as it arrives at the stretch and lateral fold station, the clamp jaws being open to receive the film wings.

FIG. 17 is a view similar to FIG. 16, but showing a later step in the operation of the apparatus in which the clamp jaws clamp on the film wings.

FIG. 18 is a similar view showing the perforating arms actuated to perforate the bottom ply of the film wings.

FIG. 19 is a similar view illustrating the article in the course of being lifted and with the clamp jaws concurrently advancing toward each other to maintain tension on the film wings beneath the package.

FIG. 20 is a similar view showing the film wings partially swept beneath the package.

FIG. 21 is a perspective view showing the article in its position also illustrated in FIG. 16.

FIG. 22 is a perspective view illustrating the article in its position also shown in FIG. 17.

FIG. 23 is a perspective view illustrating the article in its position also shown in FIG. 18.

FIG. 24 is a perspective view illustrating the article in its position also shown in FIG. 19.

FIG. 25 is a perspective view illustrating the article in its position also shown in FIG. 20.

FIG. 26 is a fragmentary top view showing the article advanced from its position shown in FIG. 20 and after the clamp jaws have released the film wings and to a position just entering the folding plow.

FIG. 27 is a fragmentary top view similar to FIG. 26 in which the article has been pushed partly through the folding plow to fold the downwardly projecting wings up against the bottom of the package.

FIG. 28 is an enlarged top view showing the package substantially in its position shown in FIGS. 18 and 23.

FIG. 29 is an end view taken along the line 29—29 of FIG. 28.

FIG. 30 is an elevation taken along the line 30—30 of FIG. 29.

FIG. 31 is an elevation illustrating the functioning of the push-off lug conveyor.

FIG. 32 is a view taken along the line 32—32 of FIG. 4 and illustrating the mechanism for both laterally adjusting the mounting mechanism for the jaw clamps and for actuating said clamps in their film stretching function.

FIG. 33 is a section taken along the line 33—33 of FIG. 32.

FIG. 34 is a fragmentary perspective view of the film tail folding mechanism.

FIG. 35 is a perspective view of the camshaft and various cams thereon.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The wrapping apparatus 40, illustrated generally in FIG. 1, is provided with an infeed table 41 which in most particulars is materially the same as the infeed table of the wrapping machine shown in U.S. Pat. No. 3,816,969. There is an infeed conveyor having push lugs 42 (see also FIG. 7) which advance article 43 to be wrapped. Article 43 is typically a palletized food item such as fresh meat. Table 41 has a longitudinally recessed way 44 to receive and guide forward travel of the article 43. No further description of the infeed table is necessary, reference being made to prior U.S. Pat. No. 3,816,969 for further details.

As in the said prior patent, a parent roll 45 of transparent wrapping film is supported on the machine frame 46 and a web or curtain 47 unrolled from roll 45 (see also FIGS. 4 and 5) is disposed vertically at the discharge end of the table 41. The technique for making a first longitudinal overwrap or fold of the film about the article 43 and for cutting off the film to a proper length from web 47 is illustrated in U.S. Pat. No. 3,816,969. See particularly FIGS. 5-10 of said prior patent.

Essentially, as is also illustrated in FIGS. 4-9 hereof, film web 47 extends downwardly through a gap 50 between input table 41 and a longitudinal folding station 39. Station 39 has a movable table comprising an assembly 52 of conveyor rollers 53 which are mounted on a wheeled carriage 54. Carriage 54 is movable longitudinally of the machine on a pair of side tracks or rails 55. For this purpose carriage 54 is provided with sets of upper wheels 56 and lower wheels 57 which embrace the track 55. Carriage 54 is actuated by a cam arm 58 (FIG. 5) which mounts below the cam shaft on the machine frame and pivots on pintle 61. At its upper end, cam arm 58 is coupled by link 62 to the carriage 54. At the center of the cam arm 58 there is a cam roller 63 engaged with cam 64 on camshaft 65. Accordingly, the receiving table or roller assembly 52 which receives the article 43 at station 39, as illustrated in FIG. 7, is itself movable longitudinally of the apparatus in accordance with the position of camshaft 65 and the shape of cam 64.

Camshaft 65 and its various cams are illustrated in FIG. 35. As shown in FIG. 4, camshaft 65 has a sprocket 48 driven by motor 49 through transmission 51 and chain 59. Transmission 51 also drives the main drive shaft 94 through chain 60 shown partially in FIG. 4.

In the various figures of the drawings, the camshaft 65 and its various cams are shown for convenience of illustration and not necessarily in exact spatial relation to other parts.

An important function of the movable support table 52 onto which the article 43 is loaded is to facilitate completion of the longitudinal wrapping of the film about the article before the article leaves the longitudinal wrap station 39. In the apparatus shown in the prior U.S. Pat. No. 3,816,969, the longitudinal fold was not completed until a much later stage in the operation of the machine. Early completion of the longitudinal fold was not necessary in the prior art apparatus because shrink film was utilized. However, in dealing with stretch film, it is part of the present invention that the longitudinal fold be completed at station 39 so that the film wings which extend laterally from the article can be clamped to impose lateral stretching tension on the film at the stretch station 66 which immediately follows the longitudinal wrapping station 39.

As in the apparatus shown in my prior U.S. Pat. No. 3,816,969, there is a sweep bar or arm 67 followed by a knife blade or anvil 68 which functions as illustrated in FIGS. 5-9 hereof and in FIGS. 5-11 of the prior patent. After the article 43 has been advanced by push lugs 42 onto the roller table 52 as shown in FIG. 7, and after the article has cleared the gap 50, the sweep arm 67 and knife anvil 68 are swept downwardly through the gap 50 to their positions shown in FIG. 9 hereof in which a knife 71 will coact with the knife anvil 68 to sever the film web 47 and produce a film tail 72 trailing from the article 43 and over the rear end of the roller table 52. The instant apparatus is also provided with a vacuum box 73 as shown in FIG. 9 and which performs the same function as the vacuum box 67 of U.S. Pat. No. 3,816,969. The mechanism for actuating the vacuum box is not illustrated herein, but is shown in FIG. 10 of said U.S. Pat. No. 3,816,969.

Apparatus of the present invention utilizes overhead wheels at station 39 which are selectively actuated to selectively drive the article 43 along its path of advance and to lock or brake the article 43 for purposes hereinafter described. As best shown in FIG. 13, there are two such wheels 74 mounted on the same axle 75. Wheels 74 are first encountered by the article 43 as it arrives as its position shown in FIG. 8. There is also a final wheel 76 mounted on its axle 77 somewhat beyond that position. The wheels 74, 76 desirable comprise pneumatic tires or foam tired cushions and their objective is to control and stabilize the partially wrapped article 43 while it successively moves through and dwells in the longitudinal folding station 39.

As best shown in FIG. 13, the common axle 75 for the rear wheels 74 is mounted on a sleeve bearing 78 and the axle 77 for forward wheel 76 is mounted on a sleeve bearing 81. The respective bearings 78, 81 are interconnected by bracket 82 and are further connected by bracket 83 to a cam follower roller 84 which follows the cam slot 85 in a cam arm 86 which is adjustably fixed on its collar 87 to bearing sleeve 88 for the drive shaft 93 to chain 91 which drives a sprocket on shaft 75 and which also drives through chain 92 through suitable sprockets to shaft 77 for front wheel 76.

Accordingly, the assembly of wheels 74, 76 is free to float vertically and to rise and fall under pressure of the article 43 so as to impose the weight of the wheels, etc., on the article 43. At the same time driving force or braking force can be imparted to the wheels through the drive shaft 93, chains 91, 92, etc. The range of vertical displacement of the wheels 74, 76 is such as to accommodate articles 43 of any anticipated height to be processed through the machine. With the wheels in their lowermost position they will rest about ⅛ inch above the rollers 53 of the roller table 52. The mechanism just described acts as a parallelogram linkage and the wheels 74 and 76 float as a unit.

The mechanism for selectively driving and locking the wheels 74, 76 is shown in FIG. 14. Main drive shaft 94 carries a sprocket 95 which drives chain 96. Sprocket 95 can be disengaged from the drive shaft 94 by means of an electrical clutch 97. Chain 96 engages a sprocket 98 on idler shaft 102. Chain 96 also engages with a sprocket 99 on drive shaft 93 which also carries a brake sprocket 103. Brake sprocket 103 is releasably engaged by a coacting brake pinion 104 fixedly mounted on lever 105. Lever 105 is pivoted at its middle on pin 101 and is actuated by thrust arm 106 which is subject to the spring 107 to normally hold the brake pinion 104 out of engagement with the brake gear 103. However, when a solenoid 108 is actuated, it will draw the thrust rod 106 upwardly against the pressure of spring 107 and swing arm 105 to a position in which the brake pinion 104 engages the brake gear 103, thus locking the chain 96 and also locking the sprocket 99 and drive shaft 93 for the wheels 74, 76.

Accordingly, suitable actuation of the clutch 97 and brake solenoid 108 will selectively lock the wheels 74, 76, or drive the wheels in a direction to advance the article 43 longitudinally of the machine, as in the direction of arrow 109 in FIG. 13.

As best shown in FIG. 4, a separate camshaft 112 driven from camshaft 65 or from transmission 51 actuates a series of cams 113 having suitable cam surfaces to actuate switches 114 respectively connected with the clutch solenoid 97 and brake solenoid 108.

The cams 113 are timed so that as the article 43 is pushed onto the roller table 52 as shown in FIG. 7 and ultimately beneath the rear set of rollers 74, the rollers 74, 76 will be driven in the direction of arrow 115 in FIG. 7 to advance the article 43 to its position shown in FIG. 8. During this movement, wheels 74 will press the film into intimate contact with the article 43. Thereafter, the brake solenoid 108 will be actuated to lock the wheels 74, 76 and hold the article 43 in its position shown in FIGS. 8, 9 and 10. Accordingly, the roller table 52 can move forward in the direction of arrow 109 in FIG. 10 and the article 43 will remain in said position.

As hereinbefore indicated, the tail 72 of the film web 47 is cut off as shown in FIG. 9. It is now desired to fold this tail under the article 43, before the article 43 moves forward out of the longitudinal wrap station 39. For this purpose station 39 is provided with film tail folding mechanism including an assembly 116 of rollers 117 which sweep down and around the rear corner of the article 43 and fold the tail 72 up against the article bottom while the article is held fast by the wheels 74. Rollers 117 are mounted as illustrated in FIG. 34 which shows the relationship between the rollers 117, the roller table 52, the wheels 74, 76 and the chains 118 on which the rollers 117 are mounted for rotation about their respective axes.

The purpose of the roller assembly 116 is to sweep the tail 72 of the film underneath the article 43 which is being held fast by the rollers 74, 76 and at the same time replace the roller table 52 which is being moved forwardly from beneath the article. Accordingly, at the completion of this movement, the article 43 will rest on the rollers 117 and not on the rollers 53 of table 52. This sequence of events is illustrated in FIG. 10.

In FIG. 10, the article 43 is locked in position by the wheels 74 and the roller table 52 is being moved forwardly in the direction of arrow 109 out from beneath the article 43. However, chains 118 have not been actuated to move in the direction of arrow 119 during which movement the foremost roller of rollers 117 will pick up the film tail 72 and fold it under the article 43. Succeeding rollers 117 will follow directly behind the foremost roller and as roller table 52 moves forward on its carriage 54, the roller assembly 116 will replace roller table 52 beneath the article 43 to support it.

Chains 118 of roller assembly 116 are driven by the apparatus shown in FIGS. 4 and 15. At their upper corners, chains 118 pass about sprockets 122 each connected to a drive sprocket 123 each connected to a chain 124 connected at its lower end to drive sprocket 125. Drive sprockets 125 are connected by shaft 121 and one drive sprocket has a crank arm 126 coupled by a link 127 to swing arm 128 as shown in FIG. 15. The swing arm 128 is mounted on its lower end on a fixed pivot 131 and has a cam follower 132 engaged with cam 133 on camshaft 65. Swing arm 128 is biased by spring 135 to rotate clockwise as viewed in FIG. 15. Accordingly, when cam 133 forces arm 128 counterclockwise as shown in FIG. 15 and against the bias of spring 135, crank 126 will turn sprocket 125 and drive chain 124 to drive chains 118 and move the roller assembly 116 in the direction of arrow 119 in FIG. 10. Concurrently, the camshaft 65 actuates cam 64 as shown in FIG. 5 to move the roller table 52 in the direction of arrow 109 in FIG. 10.

At the completion of the aforesaid movement of the roller assembly 118, the film tail 72 will be laid up flat against the bottom of the article 43 as indicated in FIG. 11. Also as shown in FIG. 11, the control mechanism of FIG. 14 to the overhead wheels 74, 76 is now driving the wheels 74, 76 in the direction of arrow 136 (FIG. 21) to advance the article 43 in the direction of arrow 109 (FIGS. 11 and 13) and toward the stretch station 66.

FIG. 4 also shows mechanism for swinging the film tail underfolding roller assembly 116 physically about the pivot shaft 344 for the upper sprockets 122, thus to facilitate maintaining the gap 50 between the input table 41 and the longitudinal folding station 39 as small as possible. For this purpose, side plates 345 on which the sprockets 123 are mounted, and on which the other corner sprockets 346, 347 which define the path of chain 118 are also mounted, are swung forwardly to enlarge the gap 50 during sweeping motion of the rollers 117. This avoids crowding of the rollers 117 and the sweep bar 67 and knife anvil 68 when they pass in opposite directions through the gap 50. For this purpose, the support plates 345 on which the entire assembly 116 swings about pivot 344 is connected by pin 348 to a swing bar 349 which is pivoted substantially at its midpoint on the pintle 352 to a fixed frame element 353. The lower end of the swing arm 349 is provided with a cam follower 345 which follows cam 355 on camshaft 65. Accordingly, at the appropriate time in the operation of the machine when the rollers 117 start to move back toward the feed-in end and up, cam 355 will swing the upper end of the swing arm 349 counterclockwise as shown in FIG. 4, thus to alter the path of the roller assembly 116 forwardly and increase the gap 50. This does not interfere with the movement of the sweep arm 67 and knife anvil 68. Accordingly, plenty of room is provided for the sweep arm 67 and knife anvil 68 to return upwardly through the gap 50 without conflict with the rollers 117 which are still negotiating the corner adjacent sprocket 346.

Between the longitudinal wrap station 39 and the stretch station 66 there is a knurled roller 137 driven by chains and sprockets indicated generally by reference character 134 in FIG. 4 from drive shaft 94. The knurled roller 137 advances the partially wrapped article 43 to its position shown in FIGS. 12 and 28. Accordingly, the longitudinal wrap of the film about the article has been completed at station 39 and the film has laterally projecting wings 138 as shown in FIGS. 13, 28 and 16.

Meanwhile, as soon as the partially wrapped article 43 traverses the knurled roller 137 the drive mechanism for the roller assemblies 52, 116 will reverse direction to restore these assemblies to their initial positions as shown in FIGS. 4 and 5.

As best shown in FIG. 15, the drive mechanism for the roller assembly 116 is provided with a safety interlock to shut off the machine in the event of an article jam or in the event an operator has his hand caught in the machinery of the station 39. For this purpose the swing arm 128 is provided with a pivotal sub-arm 141 connected at its top by pintle 142 to the top of arm 128. At its lower end, sub-arm 141 has a headed pin 149 extending through a bracket 143 welded to arm 128. Compression spring 144 is between the head of pin 149 and the bracket 143. Sub-arm 141 can swing counterclockwise about pintle 142 in FIG. 15 against the bias of spring 144 until the pin head finally bottoms on the bracket stop 143. Arm 128 also carries switch 145 mounted on a bracket 146. Switch 145 has a switch actuator plunger 147 projecting toward the sub-arm 141 and normally in contact therewith to close the switch to energize the drive. If, during counterclockwise swinging motion of arm 128 in FIG. 15 to drive chains 118 in the direction to advance roller assembly 116 in the direction of arrow 119 in FIG. 5, jam should occur and impose drag on the chain 118, continued movement of arm 128 will cause subarm 141 to swing counterclockwise on its pivot 142 and pull sub-arm 141 away from the switch plunger 147 and de-actuate the switch 145 to disconnect drive to the machine.

The partially wrapped package including the article 43 and its partially folded film wrapper with extending wings 138 is delivered as previously described into the stretch and lateral fold station 66, and will assume the typical position shown in side elevation in FIG. 12. To prevent the knurled roller 137 from advancing the package too far, a stop 148 is provided.

Referring to FIGS. 28 and 16–20, the stretch and lateral fold station 66 comprises laterally spaced, longitudinally extending rails 150 along which the margins of the article 43 slide. Midway between the slide rails 150 there is also a narrow strip 152 to the side of which are journaled on horizontal shafts a series of narrow wheels 153. The narrow wheels will slightly indent into the relatively soft undersurface of the paperboard or plastic tray which typically constitutes a pallet base of the article 43, thus to track the article properly in its advance in the direction of arrow 154 in FIG. 28.

Spaced laterally outwardly from the rails 150 are two sets of clamp jaws 155. Each set of jaws 155 comprises a bottom jaw 159 having a longitudinally extending grooved anvil 156, and a top jaw 160 having a longitudinally extending tongue 157 which coacts with the grooved anvil for clamping the laterally extending film wings 138 in the jaws when the jaws are closed.

When the package arrives at the stretch station 66, the jaws 155 will be open as shown in FIGS. 16 and 21. The respective jaw parts 159, 160 are interconnected on a hinge 158 upon which the jaws pivot. The next step in the operation of the machine is for the jaws 155 to close on the film wings 138 as shown in FIGS. 17 and 22. The tongues 157 will coact with the grooved anvils 156 to insure non-slip engagement of the jaws with the film wings 138.

The jaws 155 are then moved laterally outwardly and away from each other to stretch the film about the article 43 as shown in FIGS. 18 and 23. Considerable tension is imposed on the film during this stretching step and the film will snug itself around the article 43 and all slack will be pulled out of the film.

The next step is illustrated in FIG. 18. A certain amount of air is trapped in the space 161 between the upper ply 162 and lower plies 163 of the film in the wings 138. Accordingly, any attempt to fold the wings 138 around the article 43 with the air trapped in the space would result in a bulged package and the resistance of the trapped air would interfere with smooth folding of the wings against the article. Accordingly, the apparatus is provided with a pair of film perforating bars 164. Each bar 164 is provided along its upper edge with a series of prongs 165. Accordingly, in the FIG. 18 position of the parts, the bars 164 are actuated to pierce the prongs 165 through the lower plies 163 of the film wings 138, thus to introduce perforations or punctures therethrough. The prongs 165 are not long enough to reach the top ply 162 of the film wings. Accordingly, the punctures will only be in the bottom plies of the film wings. The puncture bars 164 are then withdrawn preparatory to the next step.

In the next step shown in FIG. 19, the support elements 150, 152, 153 for the article 43 are elevated at the same time that the clamp jaws 155 are moved inwardly beneath the elevated article, all as shown in FIG. 19. The rate of elevation of the article 43 and the rate of approach of the clamp bars 155 are such as to maintain stretching tension on the film of the package. FIG. 20 shows a further advanced condition in which the clamp jaws 155 have been moved inwardly. Concurrently, slide rails 150 are swung inwardly to clear the side margins at the underside of the article 43. In this position, the film wings 138 have now been folded partially up against the film on the bottom of the article 43. Because the film tends to adhere to itself, the wings 138 are now anchored beneath the article 43 and tension can be released without releasing tension from the film. Note that the punctures 166 in the lower film wing plies 163 have been closed by contact with the film at the bottom of the package. Prior to such closure, air trapped in the space 161 was able to escape or bleed off through the punctures 166 as the clamp jaws 155 moved between their positions shown in FIGS. 18 and 20. At this point the clamp jaws 155 open to release the film wings 138.

The mechanism for operating the clamp jaws 155, lifting the article 43, etc., as just described, is shown in FIGS. 4, 28, 29 and 30. The clamp jaws 155 are respectively mounted by their hinges 158 to carriages 179. Each carriage 179 comprises a pair of longitudinally spaced, laterally extending bracket plates 167 secured along their top edges to the lower clamp jaws 159 of the clamp jaws 155 (FIGS. 29, 30). As typically shown in FIG. 30, each hinge comprises a pair of axially spaced knuckles 190 attached to the undersurface of lower jaw 159 by a bracket plate 169. Axially between knuckles 190 is a center knuckle 191 connected to the upper jaw 160 of the jaws 155. Hinge pin 200 pivotally interconnects the respective knuckles 190, 191. The brackets 167 for the carriage 179 are provided with support wheels 168 on which the carriages 179 ride laterally in and out on tracks 171. Tracks 171 extend laterally of the machine and are supported on main frame elements 170 and are interconnected at their ends by braces 172.

The respective carriages 179 are moved along tracks 171 by drive chains 175, 177 best shown in FIG. 32. The chains are supported at their outboard ends on sprockets 173 mounted on brackets 174 connected to a machine frame part, such as the braces 172 (FIG. 30). The inboard ends of chains 175, 177 are engaged with sprockets 182, 183 mounted on a centrally located machine frame element 184 (FIGS. 32 and 33). The upper run of chain 175 in FIG. 32 is connected by a bracket arm 176 to one carriage 179. The lower run of chain 177 in FIG. 32 is coupled by bracket 178 to the other carriage 179. Accordingly, as chains 175, 177 are driven they will move the carriages 179 in and out along tracks 171.

As best shown in FIGS. 32 and 33, the inner ends of the respective chains 175, 177 are engaged with sprockets 182, 183 which are mounted on a plate 184. Plate 184 also supports a sprocket 185 connected to a drive chain 186. Sprockets 182, 183, 185 are also geared together for concurrent movement, as shown in FIG. 33 where the sprockets 182, 183, 185 are also provided with intermeshing gears 187, 188 and 189. Accordingly, when chain 186 turns sprocket 185 it will also transmit motion to sprockets 182, 183 and hence drive the chains 175, 177 and the carriages 179.

FIG. 32 shows apparatus used in one mode of operation to initially adjust the lateral spacing between the carriages 179 and hence between clamp jaws 155, thus to adjust the apparatus to any particular width of article being processed therethrough. The same apparatus is also used in another mode of operation to drive the carriages 179 in and out in the course of stretching the film about the article as hereinbefore described. This apparatus comprises the chain 186 which engages the sprocket 185 as shown in FIGS. 32 and 33. From the foregoing it is clear that rotation of sprocket 185 will concurrently drive the chains 175, 177 to concurrently move the carriages 179 in and out.

Chain 186 is partially wrapped about a pair of widely spaced sprockets 192, 193 which are both freely rotatably mounted on a fixed plate 194. The chain 186 continues around another pair of sprockets 195, 196 which are more narrowly spaced to be disposed generally between and somewhat offset laterally from the sprockets 192, 193, and thence around sprocket 214. Sprockets 195, 196 are freely rotatably mounted on a swing arm 197 which is pivotally mounted on pintle 198 to a lateral extension 199 of the plate 194 which is a fixed part of the machine. The swing arm 197 can be made to swing about its pintle 198 between the several positions shown in broken lines in FIG. 32 in response to the movement of cam 202 which is mounted on camshaft 65. Cam follower 203 rides in a cam groove 204 and is connected through a thrust rod 205 to a bell crank 206 which is pivotally mounted on pintle 207 to a lateral extension 208 on the extension 199 of the plate 194. Bell crank 206 is pivotally connected on pintle 211 to a crank arm 212 and through a pintle 213 to the swing arm 197. Accordingly, during operation of the machine and rotation of camshaft 65 the swing arm 197 will be rocked through its various broken line positions shown in FIG. 32.

Sprocket 214 engaged with chain 186 is fast to a shaft 215 which has another fixed sprocket 216 connected to a chain 217 which is in turn connected to a sprocket 218 on a shaft 219 on which is mounted a package width adjusting knob 220. Knob 220 is exposed at the front of the machine as shown in FIG. 1 and performs the same function as knob 23 of the device of the prior patent 3,816,969. Knob 220 adjusts the width of the way 44 which receives articles to be processed on the machine. As the knob 220 is turned for that purpose, it also rotates the chain 217 of FIG. 32 and will hence actuate the chain 186 to adjust the spacing of the carriages 179 so they will be positioned at an appropriate spacing to adjust to the width of the package when it arrives at the stretch station. This is one of the modes of operation of the FIG. 32 apparatus.

During operation of the machine, the knob 220 is not turned and sprocket 214 will be substantially fixed in any previously adjusted position. However, as the packages are processed through the machine, the camshaft 65 will turn and will operate the FIG. 32 apparatus in another mode in which swing arm 197 swings about its pintle 198. This will swing the two sprockets 195, 196 to the right and left as shown in FIG. 32, thus to drive chain 186 and sprocket 185 in order to drive the carriages 197 for purposes of stretching the film, etc. as hereinbefore described.

Other drive functions for the gripping jaws 155 are illustrated in FIGS. 28, 29 and 31. The jaws 155 are opened to their positions shown in FIGS. 16 and 21 by crank arms 223 which are pivotally connected to thrust rods 224 and a bell crank 225 having a pintle 226 fixed to the bracket plate 167 of carriage 179. The end of the bell crank 225 carries a roller 227 on the undersurface of which bears a lift rail 228. Roller 227 has a coaxial roller 231 (FIG. 30) mounted on the same shaft and on the top of which there is a depression rail 232. Rails 228, 232 are interconnected at their ends at 233 (FIG. 29) although they are laterally offset and move as a unit.

Bottom of lift rail 228 is provided at both sides of the machine with downwardly projecting racks 234. The respective racks 234 are engaged with fixed cogwheels or pawls 234 mounted on a shaft 239 which is operated by one thrust rod 236 and one cam 237 on camshaft 65 (FIG. 29). Accordingly, as the machine operates and camshaft 65 turns, the lifting and depression rails 228, 232 will be raised and lowered to actuate the linkages 223, 224, 225, 227 to open and close the clamp jaws 155 on the film wings 138 as hereinbefore described.

Tracks or rails 150 on which the article slides are raised and lowered in accordance with machine operation. Rails are respectively mounted on lift brackets 238 (FIG. 29) which have lateral extensions 241 which carry rollers 242 which ride on a T-shaped bar 243 which has a central lift bracket portion 244 actuated by a thrust rod 245 engaged in cam 246 on camshaft 65. Accordingly, in operation of the machine, lift bar 243 is periodically lifted to raise the rails 150 in synchronism with the movement of the carriages 179 inwardly toward each other in the course of underfolding the wings 138 beneath the package as hereinbefore explained.

As hereinbefore indicated, the rails 150 are moved inwardly from their position shown in FIG. 19 to their position shown in FIG. 20, as the clamp jaws 155 move toward each other to fold the film wings 138 beneath the package. This is accomplished by the structure shown in FIGS. 28 and 29 in which the rollers 242 which bear on the lift bar 243 are also provided with toggle links 247 pivoted on pintles 248 to the bracket plates 167 of the carriages 179. Moreover, the brackets 238 for the rails 150 are extended downwardly below the rollers 242 and these extensions 251 are provided with slots 252 about rollers 253 in arm extensions 254 of the brackets 167 of carriages 179. Accordingly, as the lift bar lifts the rollers 242, toggle arms 247 tend to straighten out with respect to the extensions 241 of the rail bracket 238 and pivot the brackets 238 about the rollers 253, thus swinging the rails 150 from their positions shown in FIG. 19 to their positions shown in FIG. 20.

The uppermost clamp jaw 160 of each clamp jaw set 155 is provided with a sliding top plate 161 having package rails 262 projecting upwardly therefrom. As shown in FIG. 20 and before the jaws 155 open to release the film wings 138, plates 261 are slid inwardly toward the article 43 to dispose the rails 262 adjacent the sides of the article and provide guide surfaces along which the article is slid for subsequent operations. Slide plates initiate the underfold step.

The mechanism for sliding the plates 261 in and out is shown in FIGS. 4, 28 and 29. As shown in FIG. 4, crank 263 is pivotally connected to the machine frame on a pintle 264. One end of the crank 263 is connected by a thrust rod 265 to a cam on camshaft 65 to operate in time with the machine. The other end of crank 263 is provided with a roller 266 engaged in a clevis 267 mounted on the end of crank 268 in turn mounted on the pintle 269 to a fixed frame member 270.

The other end of the crank 268 is connected on a pintle 273 through a thrust rod 274 which engages through a pintle 275 and free end 276 of a bell crank 277 having its opposite end 278 connected by pintle 281 to a short link 282 connected by pintle 283 to the slide plate 261. A duplicate set of linkages 275–283, inclusive, is provided at the other end of the plate 261 and these parts are given the same reference characters in FIG. 28. The two pintles 275 are interconnected by a cross link 284. At its center point, each bell crank 277 is provided with a sliding pivot 285 which depends therefrom into engagement with a slot 286 on the upper slide plate 261. Accordingly, when thrust rod 274 is pulled to the left in FIG. 28, bell cranks 277 will turn on sliding pivots 285 and pivots 283 will impart motion to the slide plate 261 and slide plate 261 will slide in the direction of arrow 287 toward the article 43 and ultimately to its position shown in FIG. 20.

As is clear from FIG. 28, both of the top clamping bars 261 at both sides of the machine are provided with the sliding plate arrangement just described and act concurrently, each being provided with the actuating mechanism 263–274, as shown in FIG. 4.

As previously described, after the stretched film has been laterally folded at least partially beneath the article as shwon in FIG. 20, and the jaws 155 open to release the film wings 138, the package is further advanced in the direction of arrow 154 through a conventional tapered plow plate 288, as is diagrammatically indicated in FIGS. 26 and 27. For this purpose a propelling finger or lug 291 mounted on an overhead chain conveyor 292 (FIGS. 4 and 31) picks up the article 43 and pushes it through the plow 288. The converging edges 293 of the plow 288 engage the downwardly extending film wings 138 to fold these up flat against the bottom of the article 43. Conveyor actuated finger 291 then advances the completed package to a heated belt 294 (FIG. 4) which will heat seal the underfolded film wings to the package bottom and discharge the package from the machine.

The construction of the overhead chain conveyor 292 is shown in FIGS. 4 and 31. It comprises a fixed support having side plates 296 (FIG. 4) to which a support rail 295 is attached and at the ends of side plate 296 end sprockets 297 are rotatably connected. The chain 292 travels about the sprockets 297 and one of these sprockets is provided with a coaxial sprocket engaged with drive chain 298 which in turn engages drive sprocket 299 on drive shaft 94.

FIG. 31 shows how the pusher finger 291 is mounted and driven by the chain 292. A carriage 302 having four wheels 303 runs freely along the track 295. The wheels 302 are grooved so as to receive the track 295 in the grooves. These wheel grooves also provide a way within which to receive the finger 291. Chain 292 is coupled to the finger 291 on a pintle 304. When the finger 291 has advanced the article 43 onto the heated belt 294, the pintle 304 on chain 292 will travel arcuately around the front end sprocket 297 to lift the finger 291 to its uppermost position shown in dotted lines in FIG. 31. Continued chain movement will then retract the finger 291 in the direction of arrow 305 in FIG. 31. When the finger has reached its rearmost position on the conveyor, pintle 304 will travel arcuately downwardly around the rear sprocket 297 and lower the finger 291 to its operative pushing level shown in full lines in FIG. 31. Accordingly, while the finger 291 is being retracted in the direction of arrow 305, it will be up out of the way of the advancing article 43 moving in the direction of arrow 154 in FIG. 31.

FIG. 4 also shows a safety switch 306 which is in the control circuit to the machine drive and which will open in the event of a jam in the operation of the article discharging conveyor 292.

Switch 306 is mounted on swing arm 307 pivoted on pintle 308 to the machine frame. At its lower end the swing arm 307 is provided with a rotatable gear 311 which walks on the links of chain 298. Sprocket 299 on drive shaft 94 is driving in the direction of arrow 312 and chain 298 is moving in the direction of arrow 313. In the event of an obstruction or a jam which imposes a load on the finger 291 which moves in the direction of arrow 154, the run of chain 298 in contact with the cogwheel 311 will slack as shown in FIG. 4, thus permitting the swing arm 307 to swing clockwise as viewed in FIG. 4 and separate switch 306 from actuating pin 315 which is mounted on cover 316 (FIG. 2). This breaks the circuit to the drive mechanism and stops the machine.

FIGS. 2 and 3 illustrate novel mechanism to also utilize jam responsive switch 306 to function as a safety interlock to prevent operation of the machine until all safety guards or covers are closed about the operating parts. These parts include a cover 316 which slides in the direction of double-headed arrows 317 in FIG. 1 to open and close the space about the discharge conveyor 292 and the various folding stations and the mechanism utilized at such stations. Cover 318 encloses the mechansim below the infeed table 41. Cover 321 encloses the mechanism below the stretch and lateral fold station 66. Actuating pin 315 for switch 306 is mounted on cover 316 and projects through a suitable hole in the wall 322 of the chamber 323 in which the switch 306 is located. In order for actuating pin 315 to be in a proper spatial relationship with the switch 306, cover 316 must be slid completely to the right as shown in FIGS. 1 and 2. Any movement of the cover 316 to the left in those figures will open the switch 306.

The apparatus illustrated in FIGS. 2 and 3 also requires complete closure of covers 318 and 321 in order to close switch 306. Just inside of cover 321 there is a box section or hollow stationary support frame member 324. The lefthand end wall 320 of the frame member 324 is provided with an opening 325 to receive a pin 326 mounted on a lug 327 which depends from the cover 316. This pin 326 must be completely received through the hole 325 in order to permit the cover 316 to be moved entirely to the right for actuation of switch 306 by the pin 315. However, inside of the hollow frame 324 there is a pivoted obstruction in the form of a tab 329 on one end of a lever 328 pivoted on a pin 331. The end of the lever 328 at the righthand side of the pivot 331 as shown in FIG. 2 is aligned with a downwardly projecting pin 332 depending from top flange 334 of cover 321. Pin 332 is aligned with a hole 333 in the top wall of the hollow frame member 324. However, the pressure of the top flange 334 of the cover 321 will normally thrust the pin 332 through hole 333 to engage and pivot the lever 328 to its full line position shown in FIG. 2 to remove the obstruction 329 to entry of the pin 326 to its position shown in FIG. 2. However, if the cover 321 is not in place, pin 332 is not present and nothing prevents lever 328 from swinging to its broken line position in FIG. 2 in which it presents the obstruction 329 to the entry of the pin 326 and hence prevents cover 316 from moving completely to the right in FIG. 2. Accordingly, cover 321 must be in place before the switch 306 can be closed.

Another interlock shown at the righthand end of hollow frame member 324 requires cover 318 to be closed before switch 306 can be actuated. This interlock comprises a sliding block 335 having a vertically oriented socket 336. When block 335 is retracted against spring 337, socket 336 aligns with a hole 338 in the top wall of the hollow frame member 324 and hence recieves another pin 340 depending from the top flange 334 of cover 321. At its righthand side as shown in FIG. 2, the block 335 faces a pin 341 on flange 343 of cover 318. Pin 341 is aligned with a hole 342 on the end wall of hollow frame member 324. This pin 341 will be pushed to the left in FIG. 2 by the act of closing cover 318 so that when cover 318 is closed and pin 341 is pushed to its position shown in FIG. 2, the socket 336 in the block 335 is aligned with the hole 338 thus to receive the pin 340. If the cover 318 is not in place, socket 336 is misaligned with the hole 338 and the block 335 acts as an obstruction to entry of the pin 340 and cover 321 will not close and will project upwardly so that cover 316 cannot be closed and switch 306 cannot be actuated.

Instead of cover 316 actuating switch 306, as hereinbefore described, the covers can have their own interlock switch 309, as illustrated at the left of FIG. 4. In that event, jam responsive switch 306 would respond only to jams and not to cover movement. Where cover 316 actuates switch 309, cover 316 is provided with a switch actuating pin 310. Switch 309 is in the electric circuit to the machine drive. The foregoing description of interlock operation applies, except that the switch responsive to cover movement is switch 309, instead of switch 306.

What is claimed is:

1. Interlock mechanism for a wrapping machine having multiple guard covers, said mechanism comprising a switch, a switch actuator on one of said covers and interlock mechanism on the other said covers which will preclude said switch actuator from engaging said switch unless all such guard covers are closed, said interlock mechanism including a pin on one cover, a movable socket on a second cover and means on a third cover for moving said socket on the second cover to accept the pin on said one cover when all covers are closed.

2. Interlock mechanism for a wrapping machine having multiple guard covers, said mechanism comprising a switch, a switch actuator on one of said covers and interlock mechanism on the other said covers which will preclude said switch actuator from engaging said switch unless all such guard covers are closed, said interlock mechanism including a pin on one cover, a movable pin obstruction on another cover and means for removing the pin obstruction from the path of the pin when all covers are closed.

3. The apparatus of claim 2 in which said pin obstruction comprises a tilting lever.

4. The apparatus of claim 2 in which said pin obstruction comprises a sliding block.

* * * * *